United States Patent
Konkimalla et al.

(10) Patent No.: US 11,030,184 B2
(45) Date of Patent: Jun. 8, 2021

(54) SYSTEMS AND METHODS FOR DATABASE ACTIVE MONITORING

(71) Applicant: JPMorgan Chase Bank, N.A., New York, NY (US)

(72) Inventors: Prakash Konkimalla, Newark, DE (US); Christopher Medved, New Castle, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 187 days.

(21) Appl. No.: 15/969,900

(22) Filed: May 3, 2018

(65) Prior Publication Data

US 2018/0322165 A1    Nov. 8, 2018

Related U.S. Application Data

(60) Provisional application No. 62/501,149, filed on May 4, 2017.

(51) Int. Cl.
| | |
|---|---|
| *G06F 16/23* | (2019.01) |
| *G06F 21/60* | (2013.01) |
| *G06F 11/34* | (2006.01) |
| *G06N 20/00* | (2019.01) |
| *G06F 21/55* | (2013.01) |

(52) U.S. Cl.
CPC ...... *G06F 16/2365* (2019.01); *G06F 11/3433* (2013.01); *G06F 21/604* (2013.01); *G06F 21/554* (2013.01); *G06F 2201/80* (2013.01); *G06N 20/00* (2019.01)

(58) Field of Classification Search
CPC .................................................. G06F 16/2365
USPC ............................................................ 707/821
See application file for complete search history.

(56) References Cited

U.S. PATENT DOCUMENTS

| | | | |
|---|---|---|---|
| 7,395,537 B1 * | 7/2008 | Brown | G06F 16/217 |
| | | | 718/104 |
| 10,148,592 B1 * | 12/2018 | Pai | H04L 12/1417 |
| 10,237,298 B1 * | 3/2019 | Nguyen | H04L 63/10 |
| 2006/0277600 A1 * | 12/2006 | Goodwill | G06F 21/80 |
| | | | 726/9 |
| 2011/0063404 A1 * | 3/2011 | Raffle | H04N 7/147 |
| | | | 348/14.08 |
| 2016/0342404 A1 * | 11/2016 | Fawcett | G06F 9/50 |
| 2018/0220276 A1 * | 8/2018 | Senarath | H04L 12/1403 |

* cited by examiner

*Primary Examiner* — Syling Yen
(74) *Attorney, Agent, or Firm* — Greenberg Traurig LLP

(57) ABSTRACT

System and methods for database active monitoring are disclosed. In one embodiment, in an information processing device comprising at least one computer processor, a method for database activity monitoring may include: (1) a database monitor monitoring data from a database system and a user session with the database system; (2) the database monitor comparing the monitored data to at least one threshold; (3) the database monitor executing an automated action in response to the monitored data breaching one of the thresholds; and (4) the database monitor initiating an alert based on the breached threshold.

15 Claims, 3 Drawing Sheets

SYSTEMS AND METHODS FOR DATABASE ACTIVE MONITORING

RELATED APPLICATIONS

This application claims priority to U.S. Provisional Patent Application Ser. No. 62/501,149, filed May 4, 2017, and is related to U.S. Provisional Patent Application Ser. No. 62/500,757, filed May 3, 2017. The disclosure of each is hereby incorporated, by reference, in its entirety.

BACKGROUND OF THE INVENTION

1. Field of the Invention

The present disclosure generally relates to systems and methods for database active monitoring.

2. Description of the Related Art

Teradata's product, Viewpoint, is used to monitor and provide alerts related to the health of a Teradata database. Database health may include, for example, utilization, condition, query efficiency, etc.

Viewpoint is designed to be very user-friendly, which also means it has limited functionality. While monitoring and alerting can be configured, the settings are not specific.

SUMMARY OF THE INVENTION

System and methods for database active monitoring are disclosed. In one embodiment, in an information processing device comprising at least one computer processor, a method for database activity monitoring may include: (1) a database monitor monitoring data from a database system and a user session with the database system; (2) the database monitor comparing the monitored data to at least one threshold; (3) the database monitor executing an automated action in response to the monitored data breaching one of the thresholds; and (4) the database monitor initiating an alert based on the breached threshold.

In one embodiment, the database system may include a Teradata database.

In one embodiment, the user session may be monitored for at least one of a blocked user session, a high CPU user session, a hung loads, a long running load, and a long running user session.

In one embodiment, the method may further include receiving the at least one threshold related to the user session from at least one property file. The at least one property file may include data related to at least one of a blocked user session, a high CPU user session, a hung loads, a long running load, and a long running user session.

In one embodiment, the automated action may include at least one of aborting the user session, maintaining the user session, and changing a priority level of the user session.

In one embodiment, the database system may be monitored for at least one of abort statements, blocking user sessions, blocking on a system table, system database free space, excessive delay for the user session, and an availability of storage for user queries.

In one embodiment, the method may further include receiving the at least one threshold related to the monitored database system from at least one property file. The property file may include data related to abort statements, blocking user sessions, blocking on a system table, system database free space, excessive delay for the user session, and the availability of storage for user queries.

In one embodiment, the at least one threshold may be based on machine learning.

In one embodiment, the method may further include the database monitor retrieving custom data to process the alert. The alert may include an identification of the breached threshold, an identification of the automated action taken, and an identification of a potential impact on the user session or database system.

In one embodiment, the monitoring of data from the least one user session and the database system may be continuous.

According to one embodiment, a system for database activity monitoring may include a database system having a user session therewith, and a database monitor comprising at least one computer processor. The database monitor may monitor data from the user session and the database system; compare the monitored data to at least one threshold; execute an automated action in response to the monitored data breaching one of the thresholds; and initiate an alert based on the breached threshold.

In one embodiment, the database system may comprise a Teradata database.

In one embodiment, the database monitor may monitor the user session for at least one of a blocked user session, a high CPU user session, a hung loads, a long running load, and a long running user session.

In one embodiment, the database monitor may receive the at least one threshold related to the user session from at least one property file. The at least one property file may include data related to at least one of a blocked user session, a high CPU user session, a hung loads, a long running load, and a long running user session.

In one embodiment, the automated action may include at least one of aborting the user session, maintaining the user session, and changing a priority level of the user session.

In one embodiment, the database monitor may monitor the database system for at least one of abort statements, blocking user sessions, blocking on a system table, system database free space, excessive delay for the user session, and an availability of storage for user queries.

In one embodiment, the database monitor may receive the at least one threshold related to the monitored database system from at least one property file. The property file may include data related to abort statements, blocking user sessions, blocking on a system table, system database free space, excessive delay for the user session, and the availability of storage for user queries.

In one embodiment, the at least one threshold may be based on machine learning.

In one embodiment, the database monitor may retrieve custom data to process the alert. The alert may include an identification of the breached threshold, an identification of the automated action taken, and an identification of a potential impact on the user session or database system.

In one embodiment, the monitoring of data from the least one user session and the database system may be continuous.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Systems and methods for database active monitoring are disclosed.

Embodiments relate to a code-based Java framework that allows for fine-grain criteria in database monitoring and alerting. The framework may be plugin-based, and developers may write modules to create monitoring and alerts. Plugins may be configured via one or more properties file that may be modified by, for example, database administrators.

In one embodiment, the use of code-based modules may allow for the entry of specific criteria for monitoring Teradata. Embodiments may allow nearly any desired action to take place when a threshold is crossed.

In one embodiment, a monitor may be configured to run constantly to check the health of the system. In another embodiment, the monitor may be configured to run periodically, or as otherwise necessary and/or desired.

In one embodiment, the modules may be independent files. Thus, the logic for each "alert" may be self-contained within the module.

In one embodiment, the monitor may connect to Teradata's database monitoring partition. This may increase the efficiency of the monitoring.

In one embodiment, alerts may include taking actions, such as aborting user queries; changing, rewriting, or modifying a query; changing workloads; sending emails; opening work order tickets; etc.

In one embodiment, a front end may be provided that may accept user input (e.g., pseudo code, etc.). The front end may further be used to monitor and to manage the monitor.

Figure 1:
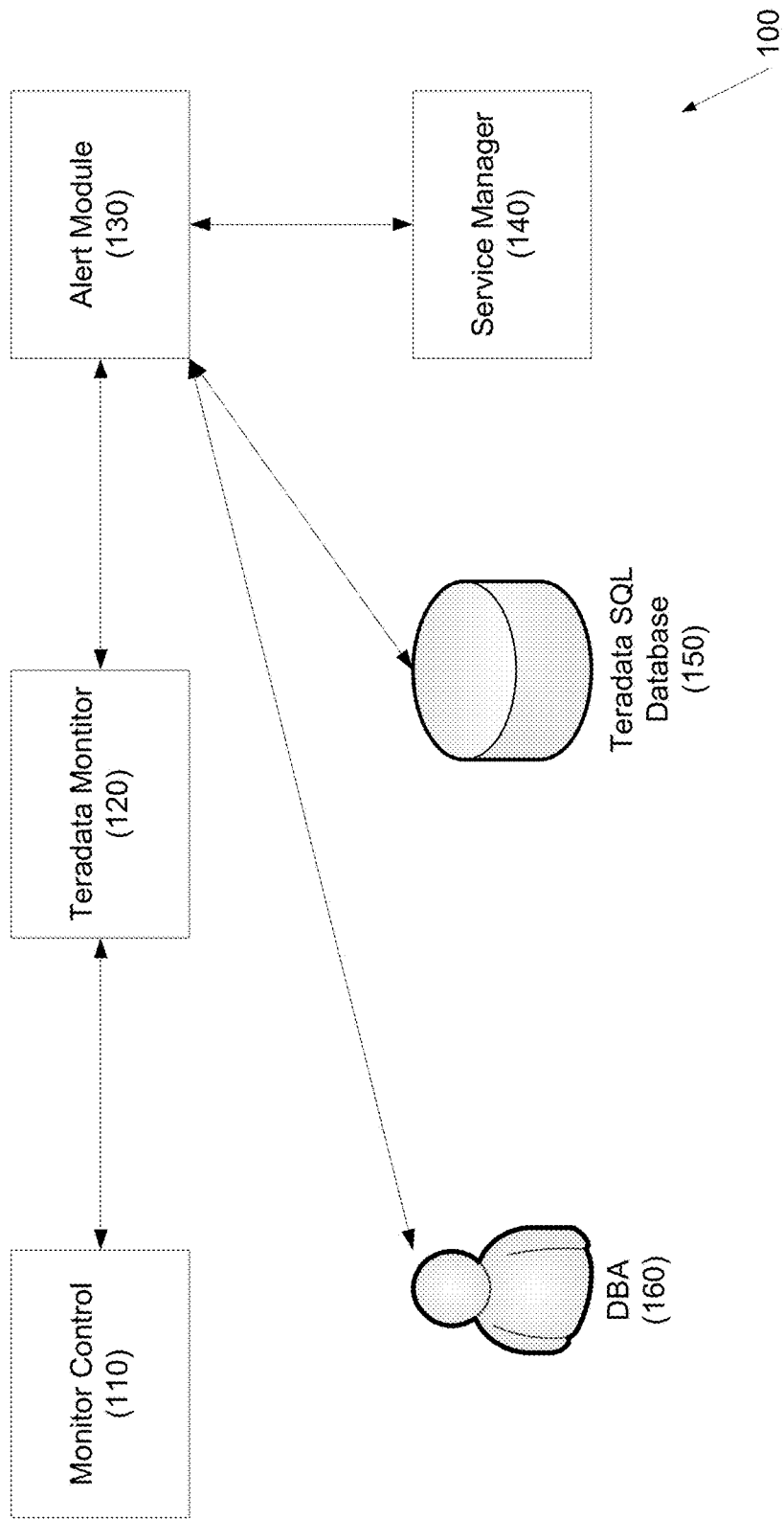
FIG. 1 depicts a system for database active monitoring according to one embodiment.

Referring to FIG. 1, a system for Teradata database active monitoring is disclosed according to one embodiment. System 100 may include monitor control 110, Teradata monitor 120, alert module 130, service manager 140, Teradata SQL database 150, and database administrator 160.

In one embodiment, monitor control 110 may be a Java-based framework that monitors the health and metrics of Teradata SQL database 150.

In one embodiment, Teradata monitor 120 may control the monitoring subsystems for monitoring Teradata SQL database 150. It may maintain and/or access one or more objects and alert thresholds.

In one embodiment, alert module 130 may maintain and/or access information regarding the alerts to generate, and the object(s) (e.g., user, session, system) for which to generate the alerts.

In one embodiment, service manager 140 may execute the alerts generated by alert module 130.

In one embodiment, Teradata SQL database 150 may be a Teradata database.

In one embodiment, database administrator 160 may be an administrator for Teradata database 160. Database administrator 160 may be a human, a team, and/or it may be automated using, for example, machine learning.

In one embodiment, one or more automated actions may be taken in response to the state of any of the monitored systems. For example, Teradata monitor 120 may abort, maintain, or modify the priority of an activity. Any other suitable actions may be taken as is necessary and/or desired.

For example, in response to monitoring a high CPU session, Teradata monitor 120 may abort the session. In response to a long running load, Teradata monitor 120 may change the priority of the job. In response to a blocked session, Teradata monitor 120 may allow the session to continue.

Figure 2:
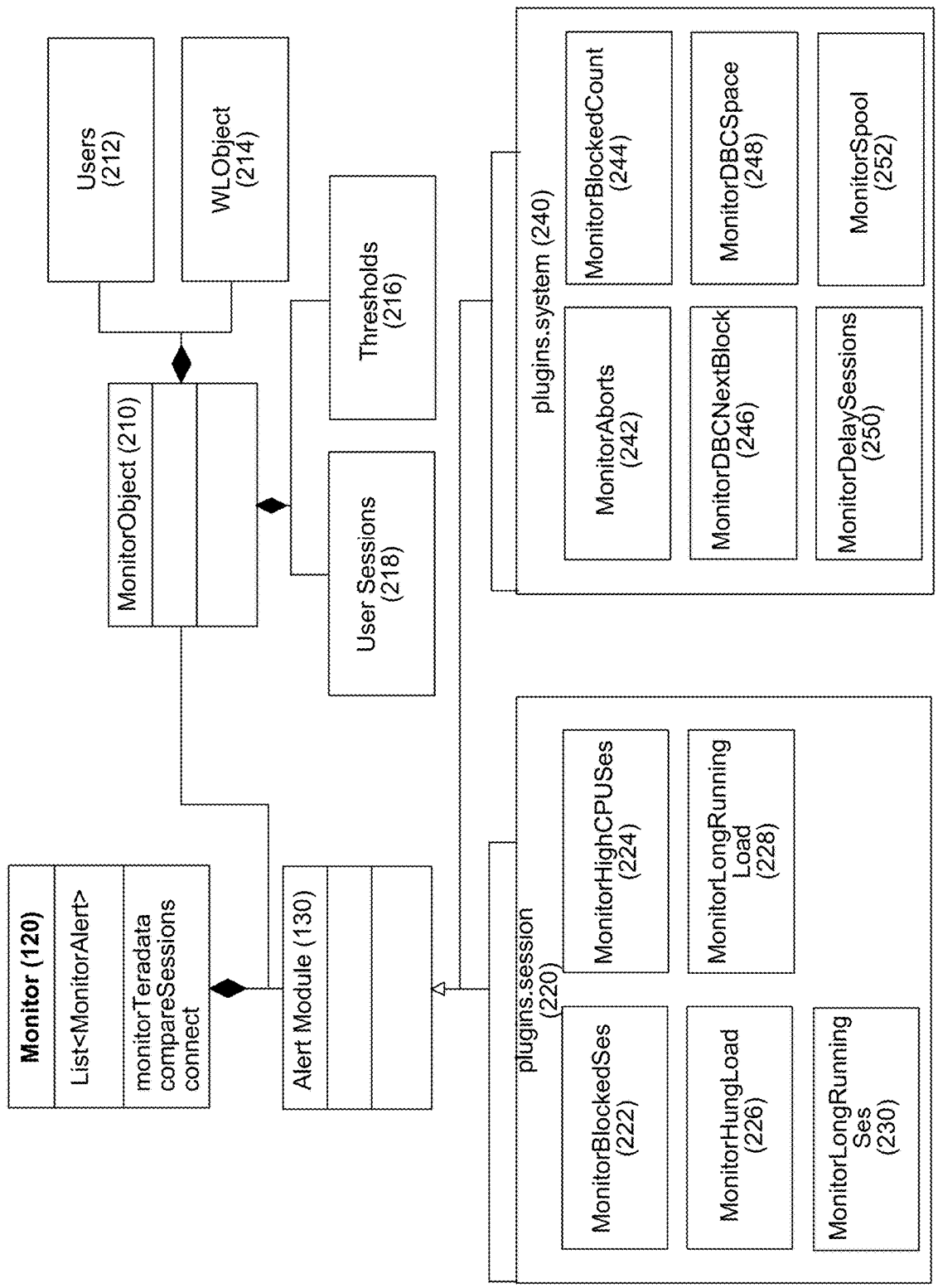
FIG. 2 depicts an architectural diagram according to one embodiment.

FIG. 2 depicts a detailed architectural diagram providing additional details of Teradata monitor 120 and alert module 130 according to one embodiment. For example, Teradata monitor 120 may read active session parameters/characteristics and may compare those parameters to defined thresholds.

In one embodiment, Teradata monitor 120 may interact with MonitorObject module 210 that may receive data on users 212, workload object (WLObject) 214, thresholds 216, and user sessions 218. Alert module 130 may receive data from property files in plugins.session 220 and plugins.system 240. Session issues may have less impact than system issues as they may only impact a session (e.g., one user) versus the system (e.g., all users).

Session property files 220 are specific to a session, and may include data related to, for example, monitoring blocked sessions 222, monitoring high CPU sessions 224, monitoring hung loads 226, monitor long running load 228, and monitor long running session 230. Other session property files may be include as is necessary and/or desired.

Plugins.system property files 240 relate to the system, and may include program files for monitor aborts 242, monitor blocked count 244, monitor DBC next block 246, monitor DBC spaces 248, monitor delay sessions 250, and monitor spool 252. For example, monitor aborts 242 may monitor excessive abort statements submitted by user or job. Excessive aborts may impacts system performance. Monitor blocked count 244 may monitor blocking sessions at system level, which may be an indication of a system wide problem. Monitor DBC next block 246 may monitor blocking on critical system table, which may impact database performance. Monitor DBC spaces 248 may monitor system database free space, which may not allow user logons if storage space is not available. Monitor delay sessions 250 may monitor user sessions for excessive delay. A longer than normal delay may be a symptom of performance degradation. Monitor spool 252—may monitor the availability of storage for user queries. Less availability of this space may cause database throughput issues. Other system property files may be include as is necessary and/or desired.

Figure 3:
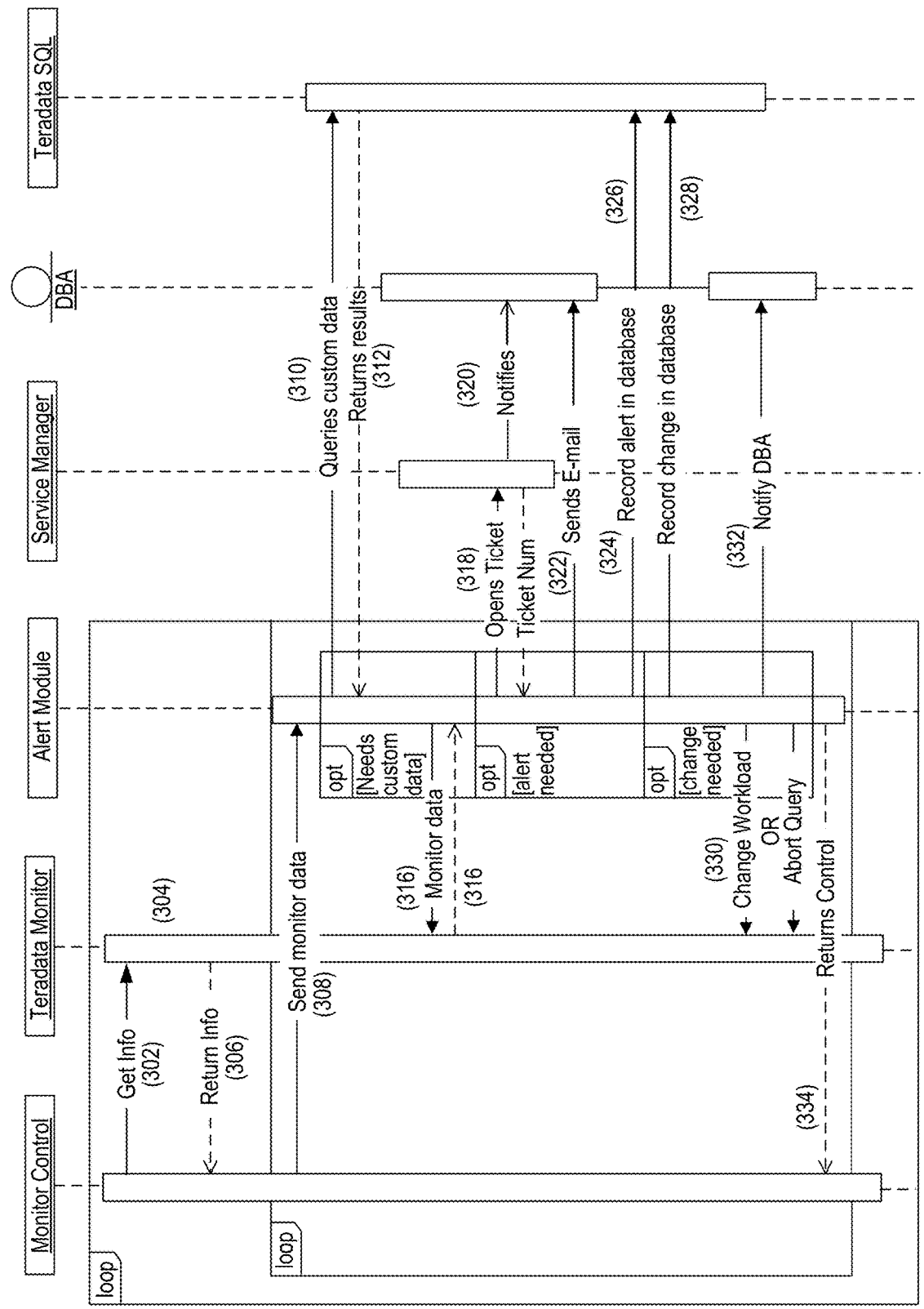
FIG. 3 depicts a process flow for database active monitoring according to one embodiment.

Referring to FIG. 3, a process flow for Teradata database active monitoring is disclosed according to one embodiment. In one embodiment, the process flow may be run as a continuous loop; in another embodiment, the process flow may be run periodically, on demand, or as otherwise necessary and/or desired.

In step 302, the monitor control may request information from a database monitor, such as the Teradata monitor. In one embodiment, the command "Get info" may be used. The Teradata module may return a status of the monitored systems.

In step 304, the Teradata monitor may monitor the subsystems and may compare the data received to one or more threshold. In one embodiment, the thresholds may be set forth in one or more property file.

If one or more of the thresholds is breached, the Teradata monitor may take an automated action (e.g., abort, maintain, change priority level, etc.).

In step 306, the Teradata monitor may return the requested information to the monitor control. In one embodiment, the Teradata monitor may identify any breaches of the threshold.

In one embodiment, steps 302, 304, and 306 may be performed continuously until the Teradata monitor identifies a breached threshold. Once identified, in step 308, the monitor control may send monitor data to an alert module. The monitor data may include an identification of the breached threshold, and the action to be taken.

In step 310, the alert module may determine whether it needs custom data (e.g., special actions to take if a threshold is met) to process the alert. If it does, the alert module may query custom data from the Teradata database, using, for example, a SQL request. In step 312, the results may be returned to the alert module.

In step 314, the alert module may return monitor data to the Teradata monitor, and in step 316, the Teradata monitor may confirm receipt In step 318, the alert module may open a job, or ticket for the service manager with the service manager, and in step 320, the service manager may notify the database administrator or communicate any other alerts as is necessary and/or desired. For example, an email, text message, or other communication may be sent.

In step 322, the alert module may communicate information on the alert to the DBA. For example, the alert module may communicate information regarding the reason for the alert, the threshold that was breached, potential session and/system impacts, any automated actions taken, any recommended actions, etc. Other information may be communicated as is necessary and/or desired.

In step 324, the service manager may return an identifier for the job or ticket to the alert module.

In step 326, the alert module may record the alert in the Teradata database using SQL. In step 328, if any changes are needed, the alert module may record the change in the Teradata database using SQL.

In step 330, the alert module may return a change workload or abort query message to the Teradata monitor, and in step 332, the alert module may notify the DBA of the change workload or abort query.

In step 334, the alert module may return control to the monitor control. The monitor control may then continue monitoring for an alert condition in steps 302 and 304, discussed above.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for database activity monitoring, comprising: in an information processing device comprising at least one computer processor:
a database monitor monitoring a plurality of user sessions associated with a database system, wherein the database system is monitored for abort statements, blocking user sessions, blocking on a system table, system database free space, excessive delay for one of the user session, and an availability of storage for user queries;
the database monitor accessing both a system property file of the database system and a session property file for each user session, the session property file comprising session data for each corresponding user session;
the database monitor comparing the session data to at least one threshold, wherein the at least one threshold is based on the session property file;
the database monitor executing an automated action for one of the user sessions in response to the session data breaching one of the thresholds, wherein the automated action comprises aborting one of the user sessions; and
the database monitor initiating an alert based on the breached threshold, wherein the alert comprises an identifier of the breached threshold, an identifier of the automated action, and an impact indicator of the user session or database system.

2. The method of claim 1, wherein the database system comprises a Teradata database.

3. The method of claim 1, wherein the session data is monitored for at least one of a blocked user session, a high CPU user session, a hung loads, a long running load, and a long running user session.

4. The method of claim 1, wherein the session data comprises at least one of a blocked user session, a high CPU user session, a hung loads, a long running load, and a long running user session.

5. The method of claim 1, further comprising:
receiving the at least one threshold from at least one of the session property files.

6. The method of claim 1, wherein the system property file comprises data related to abort statements, blocking user sessions, blocking on a system table, system database free space, excessive delay for one of the user sessions, and the availability of storage for user queries.

7. The method of claim 1, wherein the at least one threshold is set based on machine learning.

8. The method of claim 1, further comprising:
the database monitor retrieving custom data to process the alert.

9. The method of claim 8, wherein the alert comprises an identification of the breached threshold, an identification of the automated action taken, and an identification of a potential impact on the user session or database system.

10. The method of claim 1, wherein the step of monitoring the plurality of user sessions is continuous.

11. A system for database activity monitoring, comprising:
a database system having a user session therewith; and
a database monitor comprising at least one computer processor;
wherein:
the database monitor monitors a plurality of user sessions associated the database system, wherein the database system is monitored for abort statements, blocking user sessions, blocking on a system table, system database free space, excessive delay for one of the user session, and an availability of storage for user queries;
the database monitor accesses both a system property file of the database system and a session property file for each user session, the session property file comprising session data for each corresponding user session;
the database monitor compares the session data to at least one threshold, wherein the at least one threshold is based on the session property file;
the database monitor executes an automated action for one of the user sessions in response to the session data breaching one of the thresholds, wherein the automated action comprises aborting one of the user sessions; and
the database monitor initiates an alert based on the breached threshold, wherein the alert comprises an identifier of the breached threshold, an identifier of the automated action, and an impact indicator of the user session or database system.

12. The system of claim 11, wherein the database system comprises a Teradata database.

13. The system of claim 11, wherein the session data is monitored for at least one of a blocked user session, a high CPU user session, a hung loads, a long running load, and a long running user session.

14. The system of claim 11, wherein the at least one threshold is received from at least one of the session property files, the at least one of the session property files comprises data related to at least one of a blocked user session, a high CPU user session, a hung loads, a long running load, and a long running user session.

15. The system of claim 11, wherein at least one threshold related to the monitored database system is received from the system property file, the system property file comprises data related to abort statements, blocking user sessions, blocking on a system table, system database free space, excessive delay for one of the user sessions, and the availability of storage for user queries.

* * * * *